United States Patent
Oshiba

(10) Patent No.: US 10,243,825 B2
(45) Date of Patent: Mar. 26, 2019

(54) AVAILABLE BANDWIDTH ESTIMATION SYSTEM, AVAILABLE BANDWIDTH ESTIMATION METHOD, RECEPTION APPARATUS, AND RECEPTION APPARATUS PROGRAM STORAGE MEDIUM

(71) Applicant: NEC Corporation, Minato-ku, Tokyo (JP)

(72) Inventor: Takashi Oshiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 15/527,805

(22) PCT Filed: Nov. 17, 2015

(86) PCT No.: PCT/JP2015/005715
§ 371 (c)(1),
(2) Date: May 18, 2017

(87) PCT Pub. No.: WO2016/084334
PCT Pub. Date: Jun. 2, 2016

(65) Prior Publication Data
US 2017/0324635 A1 Nov. 9, 2017

(30) Foreign Application Priority Data
Nov. 27, 2014 (JP) ................................ 2014-239480

(51) Int. Cl.
*H04L 12/26* (2006.01)
*H04L 12/875* (2013.01)
(Continued)

(52) U.S. Cl.
CPC ........... *H04L 43/0882* (2013.01); *H04B 1/16* (2013.01); *H04L 43/0852* (2013.01); *H04L 47/56* (2013.01); *H04N 21/442* (2013.01)

(58) Field of Classification Search
CPC . H04L 43/0882; H04L 43/0852; H04L 47/56; H04B 1/16; H04N 21/442
See application file for complete search history.

(56) References Cited

U.S. PATENT DOCUMENTS

2011/0090811 A1* 4/2011 Ekelin ................. H04L 41/0896
370/252
2015/0180757 A1* 6/2015 Oshiba .................. H04L 47/365
370/252

FOREIGN PATENT DOCUMENTS

| JP | 2014-116771 A | 6/2014 |
| WO | 2009/118602 A2 | 10/2009 |
| WO | 2014/017140 A1 | 1/2014 |

OTHER PUBLICATIONS

Communication dated May 7, 2018 issued by the European Patent Office in counterpart European Application No. 15862836.2.
(Continued)

Primary Examiner — Jianye Wu

(57) ABSTRACT

Failure to identify an accurate rising position of a queueing delay alone has led to the inability to ensure estimation precision. An available bandwidth estimation method comprises: transmitting a packet train constituted by packet pairs arranged at equal intervals, each of the packet pairs comprising two packets of the same size arranged at a zero transmission interval, with the packet size of the packet train increasing at a constant rate; receiving the packet train; calculating an observation delay of the packets included in the received packet train; calculating a serialization delay on the basis of the reception interval between the two packets constituting each packet pair included in the received packet train; removing the calculated serialization delay from the calculated observation delay, thereby calculating a queueing delay; and estimating an available bandwidth on the basis of the calculated queueing delay.

8 Claims, 17 Drawing Sheets

(51) Int. Cl.
*H04B 1/16* (2006.01)
*H04N 21/442* (2011.01)

(56) References Cited

OTHER PUBLICATIONS

Constantinos Dovrolis et al., "Packet-Dispersion Techniques and a Capacity-Estimation Methodology", IEEE/ACM Transaction on Networking, IEEE/ ACM, New York, NY, US, vol. 12, No. 6, Dec. 1, 2004, pp. 963-977, XP002571311, ISSN: 1063-6692, DOI: 10.1109/TNET.2004.838606 (15 pages total).
KC Claffy et al., "Bandwidth Estimation: Metrics, Measurement Techniques, and Tools", IEEE Network, IEEE Service Center, New York, NY, US, vol. 17, No. 6, Nov. 1, 2003, pp. 27-35, XP011103790, ISSN: 0890-8044, DOI: 10.1109/MNET.2003.1248658 (9 pages total).
International Search Report for PCT Application No. PCT/JP2015/005715, dated Feb. 9, 2016.
English translation of Written opinion for PCT Application No. PCT/JP2015/005715.

* cited by examiner

AVAILABLE BANDWIDTH ESTIMATION SYSTEM, AVAILABLE BANDWIDTH ESTIMATION METHOD, RECEPTION APPARATUS, AND RECEPTION APPARATUS PROGRAM STORAGE MEDIUM

This application is a National Stage Entry of PCT/JP2015/005715 filed on Nov. 17, 2015, which claims priority from Japanese Patent Application 2014-239480 filed on Nov. 27, 2014, the contents of all of which are incorporated herein by reference, in their entirety.

TECHNICAL FIELD

The present invention relates to an available bandwidth estimation system, an available bandwidth estimation method, a reception apparatus, and a reception apparatus program storage medium.

BACKGROUND ART

An available bandwidth (also referred to as a usable bandwidth) of a communication line is an unused bandwidth that is obtained by subtracting other traffic flowing through the network (hereinafter referred to as cross traffic) from a physical bandwidth at a bottleneck link on the communication line. For example, when a physical bandwidth at a bottleneck link on a communication line is 100 Mbps and cross traffic is 30 Mbps, the available bandwidth 100 is 100−30=70 Mbps.

Estimation of an available bandwidth is important in applications such as video chats, videophone conversations and videoconferences in which videos are bi-directionally exchanged between terminals to communicate with each other. This is because keeping the transmission rate of video below or equal to the estimated available bandwidth makes it possible to minimize packet losses that would occur when the sum of the transmission rate of video and cross traffic exceeds the physical bandwidth at a bottleneck link on the communication line, and to ensure video quality.

In the invention of PTL 1, a transmitting-side device transmits a plurality of packets combined together in one (hereinafter referred to as a packet train) to a receiving-side device, with each of the packets for available bandwidth estimation being arranged at equal transmitting intervals and gradually increasing in packet size, as illustrated in FIG. 1. Further, the receiving-side device detects a change in the receiving interval between packets in the received packet train to estimate an available bandwidth. When the transmitting rate of packets exceeds an available bandwidth on the network while the packet train 10 illustrated in FIG. 1 is passing through the network, the packets in the packet train 10 are temporarily queued in a device, such as a router or a switch, on the network (hereinafter, a delay due to queueing will be referred to as a queueing delay). When a queueing delay occurs, the receiving interval between packets at the receiving device will be greater than the transmitting interval at the transmitting device. For example, the receiving interval between packet 3 and packet 4 in the packet train 11 illustrated in FIG. 1 is greater than the transmitting interval. The invention of PTL 1 takes advantage of this characteristic to identify a point at which the receiving interval between packets at the receiving-side device starts becoming greater than the transmitting interval at the transmitting-side device and calculates an available bandwidth by dividing a packet size corresponding to the point by the transmitting interval.

As illustrated in FIG. 2, delays that occur in packet communication can be classified into four types: 1. propagation delay, 2. processing delay, 3. queueing delay, and 4. serialization delay. A serialization delay is sometimes also referred to as transmission delay.

A propagation delay is the time required for a signal to propagate through a communication line at a speed close to the speed of light. A processing delay is the time required for determining a communication line through which packets are sent out by referring to a routing table within a device such as a router or a switch when the device receives the packets. A queueing delay is as described above. A serialization delay is the time required for transmitting all of the bits of a packet to a communication line and can be calculated by dividing its packet size by the physical bandwidth on the communication line. In other words, the serialization delay increases as the packet size increases.

The invention of PTL 1 aims to prevent degradation of the estimation precision of an available bandwidth on a network. Here, noise occurs on the network, for example, when cross traffic changes while a packet train is being transmitted, when the radio field intensity on a wireless network changes, or when transmitting and receiving timings of packets go wrong due to an influence of scheduling at a base station.

The invention of PTL 1 analyzes a broad trend of queueing delays of a plurality of packets from a macroscopic viewpoint since the invention is largely influenced by noise when checking receiving intervals or queueing delays from a microscopic viewpoint for each packet. Thus, the invention of PTL 1 can reduce the influence of noise during identification of a rising position of a queueing delay.

According to the invention of PTL 1, a specific method for identifying a point at which the packet receiving interval starts to increase is as follows. Note that the increase in packet receiving interval mentioned above is caused by an increase in a queueing delay.

The invention of PTL 1 first calculates: queueing delay=$\{tr(i)-t(i-1)\}-\{ts(i)-ts(i-1)\}$ (Formula 1). Here, $ts(i)$ is the transmitting time at which the i-th packet (i=1, 2, . . . , N) is transmitted from the transmitting-side device, where N is the number of packets in a packet train. In addition, $tr(i)$ is the reception time of the i-th packet (i=1, 2, . . . , N) at the receiving-side device, where N is the number of packets in the packet train.

In other words, the invention of PTL 1 defines a queueing delay as the difference in the times elapsed from a previous packet. In this case, an ideal progression of a queueing delay to be assumed in the total absence of the noise is a line of a horizontal straight line and a sloped straight line connected together. The invention of PTL 1 calculates, for each of a plurality of ideal curves each of which is a line of the horizontal straight line and a sloped straight line connected together, the sum of squared errors with a queueing delay calculated according to Formula 1. The invention of PTL 1 then identifies an ideal curve that yields the smallest sum of squared errors calculated. Further, the invention of PTL 1 identifies the connection point between the horizontal straight line and the sloped straight line in the ideal curve that best fits the queueing delay, the connection point being identified as the rising position of the queueing delay viewed from a macroscopic viewpoint.

Here, when integrating and rewriting Formula 1 as the elapsed time from the starting packet, Formula 1 is: queueing delay $Q(i)=\{tr(i)-tr(1)\}-\{ts(i)-ts(1)\}$. Note that progression of queueing delay $Q(i)$ to be assumed in the total absence of noise is a line of the horizontal straight line and a parabola connected together. The reason is as follows. First, since queueing delay does not occur when a transmitting rate for each packet is lower than the true value of an available bandwidth, ideal progression of queueing delay Q(i) is represented by a horizontal straight line. Further, when the transmitting rate for each packet exceeds the true value of the available bandwidth, ideal progression of queueing delay Q(i) rises in parabolic shape and thus the ideal progression of queueing delay Q(i) forms a parabola.

FIG. 3 illustrates a method for identifying the rising position of the queueing delay Q(i) described above (hereinafter referred to as the second identification method). The second identification method plots queueing delay Q(i) 12 on a plane surface with packet numbers i on the horizontal axis and queueing delay Q(i) on the vertical axis as illustrated in FIG. 3. Further, the second identification method plots ideal curves 13 as many as the number of packets, each of the ideal curves being a horizontal straight line and a parabola connected together provided that the ideal progression of queueing delay Q(i) is assumed in the total absence of noise. Note that only five ideal curves 13 are illustrated in FIG. 3, while there are (N−1) ideal curves where N is the number of packets in a packet train.

The second identification method then calculates, for each of the ideal curves 13, the sum of squared errors between each of the ideal curves 13 and the queueing delay Q(i) 12. Further, the second identification method identifies the ideal curve 13-4 that yields the smallest sum of squared errors as in FIG. 3. Lastly, the second identification method identifies the connection point between the horizontal straight line and the parabola of the ideal curve 13-4 that best fits the observed queueing delay 12, the connection point being identified as the rising position of the queueing delay viewed from a macroscopic viewpoint.

CITATION LIST

Patent Literature

[PTL 1] International Patent Publication No. WO 2014/017140

SUMMARY OF INVENTION

Technical Problem

However, the invention of PTL 1 and the second identification method described above do not take into consideration the presence of a serialization delay although the packet size increases, and therefore, the serialization delay also increases as the packet number proceeds. Thus, the invention of PTL 1 and the second identification method compare the queueing delay including serialization delay with each ideal curve. In other words, it is possible for the invention of PTL 1 and the second identification method to erroneously identify a rising position of the queueing delay and output an erroneous estimation value.

FIG. 4 illustrates a specific example of the second identification method for identifying the rising position of the queueing delay Q(i) described above. FIG. 4 illustrates the queueing delay 12 observed when transmitting and receiving a packet train constituted by approximately 100 packets via a real network, the observed queueing delay 12 actually including a serialization delay. The reason why the queueing delay 12 exhibits a linear upward trend is because the serialization delay is included. Further, the slope of the queueing delay 12 becomes steeper near the end of the packet train (near the 85-th packet) because of the influence of the queueing delay. When the second identification method is applied in the example in FIG. 4, the ideal curve 13 is selected as the best fit ideal curve. Further, the 60-th packet or a packet close to the 60-th packet is erroneously identified as the rising position of the queueing delay. Accordingly, the second identification method outputs an underestimated estimation value based on the 60-th packet or the packet near the 60-th packet that has been erroneously identified as the rising position of the queueing delay. In fact, the second identification method cannot ensure estimation precision.

An object of the present invention is to solve the problem described above and provide an available bandwidth estimation system, an available bandwidth estimation method, a reception apparatus, and a reception apparatus program storage medium that are capable of identifying a precise rising position of a queueing delay alone, thereby ensuring estimation precision even when a given observed delay includes a serialization delay.

Solution to Problem

An available bandwidth estimation system, according to the present invention, comprises: a transmission apparatus; and a reception apparatus, wherein the available bandwidth estimation system estimates an available bandwidth on a network connecting the transmission apparatus and the reception apparatus, wherein the transmission apparatus transmits a packet train constituted by packet pairs arranged at equal intervals, each of the packet pairs including two packets of an identical size arranged at a zero transmitting interval, with the packet size of the packet train increasing at a constant rate, and the reception apparatus receives the packet train transmitted from the transmission apparatus, calculates an observed delay of each packet included in the received packet train, calculates a serialization delay based on a receiving interval between two packets constituting each packet pair included in the received packet train, calculates a queueing delay by removing the calculated serialization delay from the calculated observed delay, and estimates an available bandwidth based on the calculated queueing delay.

An available bandwidth estimation method, according to the present invention, comprises a transmission apparatus and a reception apparatus, and estimating an available bandwidth on a network connecting the transmission apparatus and the reception apparatus comprises:

transmitting a packet train constituted by packet pairs arranged at equal intervals, each of the packet pairs including two packets of an identical size arranged at a zero transmitting interval, with the packet size of the packet train increasing at a constant rate; and receiving the packet train, calculating an observed delay of each packet included in the received packet train, calculating a serialization delay based on a receiving interval between two packets constituting each packet pair included in the received packet train, calculating a queueing delay by removing the calculated serialization delay from the calculated observed delay, and estimating an available bandwidth based on the calculated queueing delay.

A reception apparatus, according to the present invention, comprises:

a serialization delay calculation means for receiving a packet train constituted by packet pairs arranged at equal intervals, each of the packet pairs including two packets of an identical size arranged at a zero transmitting interval, with the packet size of the packet train increasing at a constant rate, calculating an observed delay of each packet included in the received packet train, and calculating a serialization delay based on a receiving interval between two packets constituting each packet pair included in the received packet train;

a serialization delay removal means for calculating a queueing delay by removing the calculated serialization delay from the calculated observed delay; and an estimation value calculation means for estimating an available bandwidth based on the calculated queueing delay.

A non-transitory program storage medium, according to the present invention, stores a control program for a reception apparatus, the program causing a computer of the reception apparatus to perform:

a serialization delay calculation process of receiving a packet train constituted by packet pairs arranged at equal intervals, each of the packet pairs including two packets of an identical size arranged at a zero transmitting interval, with the packet size of the packet train increasing at a constant rate, calculating an observed delay of each packet included in the received packet train, and calculating a serialization delay based on a receiving interval between two packets constituting each packet pair included in the received packet train;

a serialization delay removal process of calculating a queueing delay by removing the calculated serialization delay from the calculated observed delay; and an estimation value calculation process of estimating an available bandwidth based on the calculated queueing delay.

[Advantageous Effects of Invention]

The available bandwidth estimation system, the available bandwidth estimation method, the reception apparatus, and the reception apparatus program storage medium according to the present invention have the advantageous effects of identifying a precise rising position of a queueing delay alone, thereby ensuring estimation precision even when a given observed delay include a serialization delay.

EXAMPLE EMBODIMENT

<First Example Embodiment>

A first example embodiment of the present invention will be described.

Figure 1:
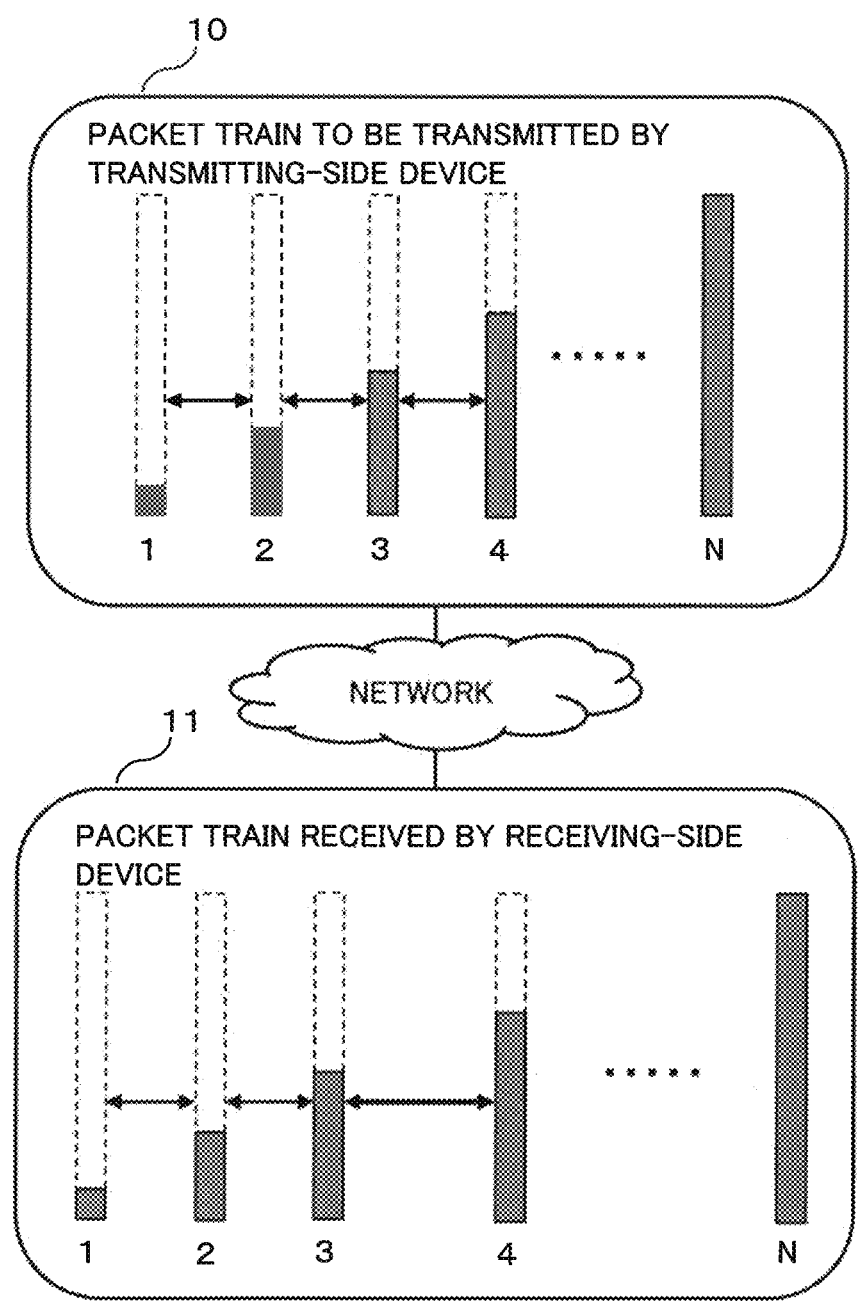
FIG. 1 illustrates a packet train transmitted and received in the invention of PTL 1.
Figure 2:
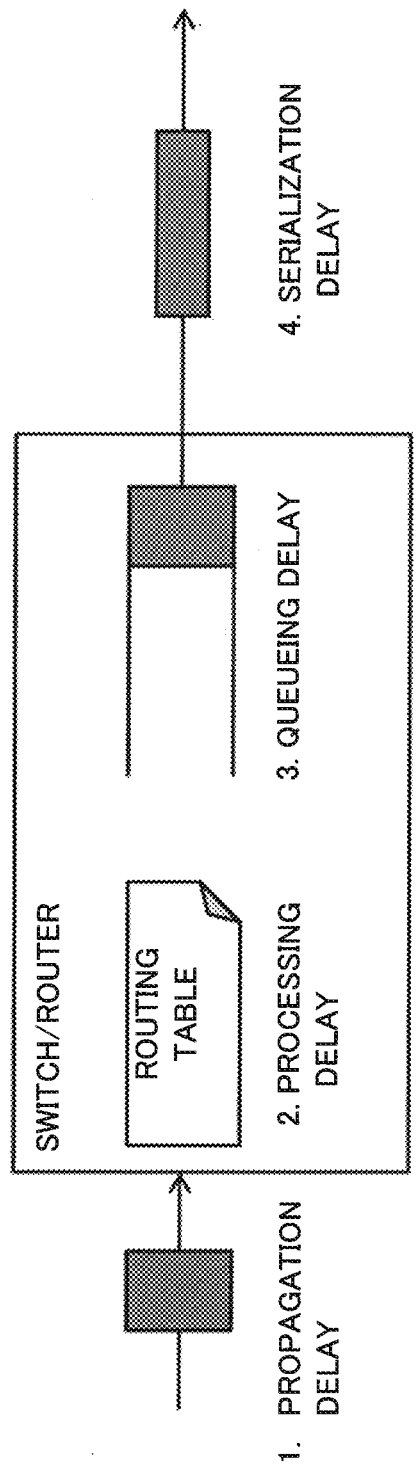
FIG. 2 illustrates types of delays that occur in packet communication.
Figure 3:
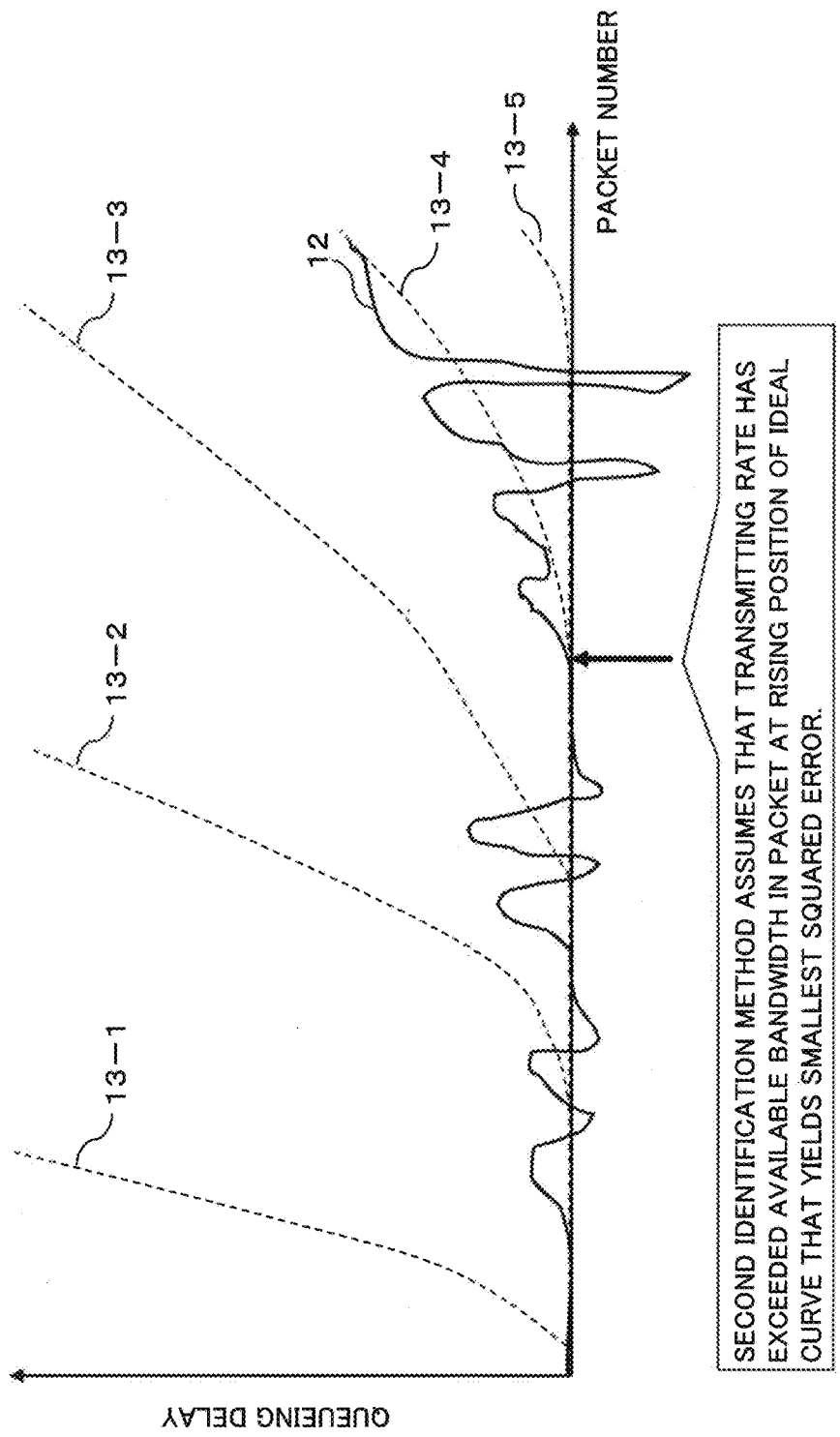
FIG. 3 illustrates an example of a second identification method for identifying the rising position of an observed queueing delay.
Figure 4:
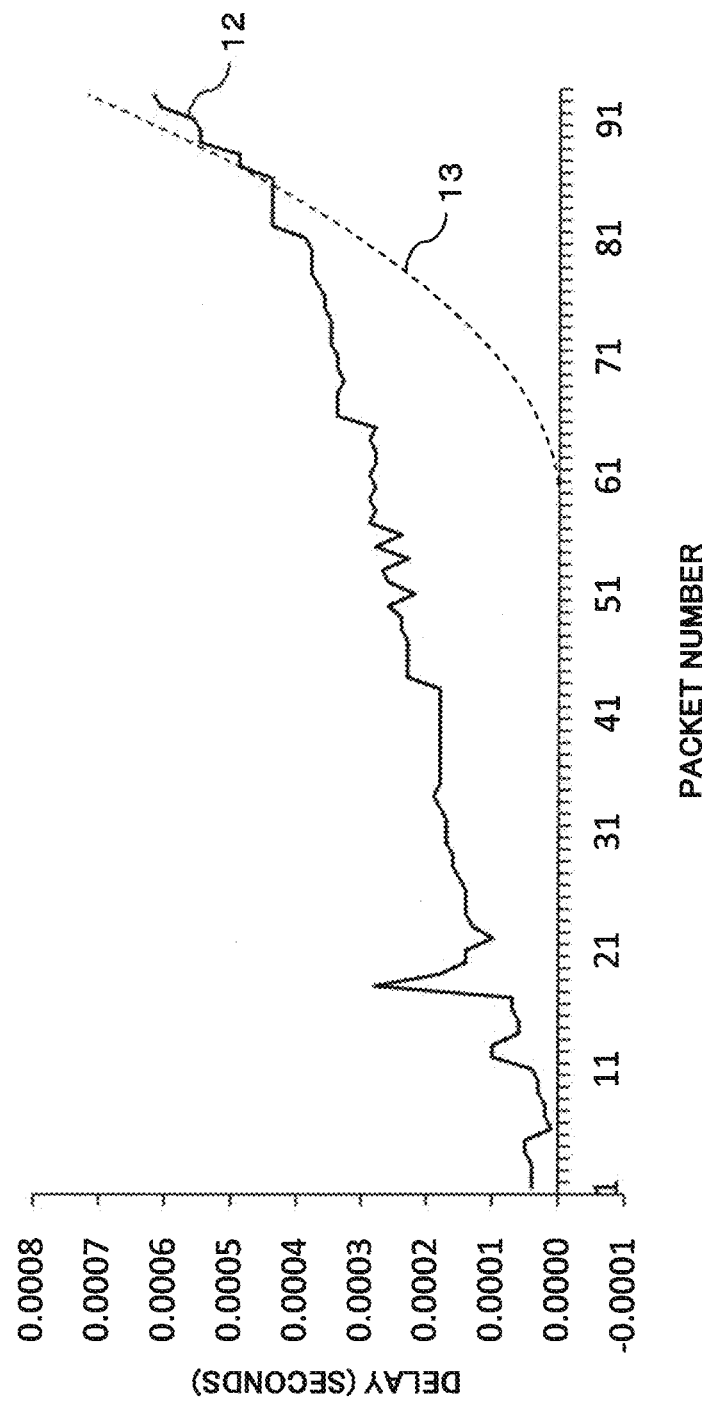
FIG. 4 illustrates a specific example of the second identification method for identifying the rising position of an observed queueing delay.
Figure 5:
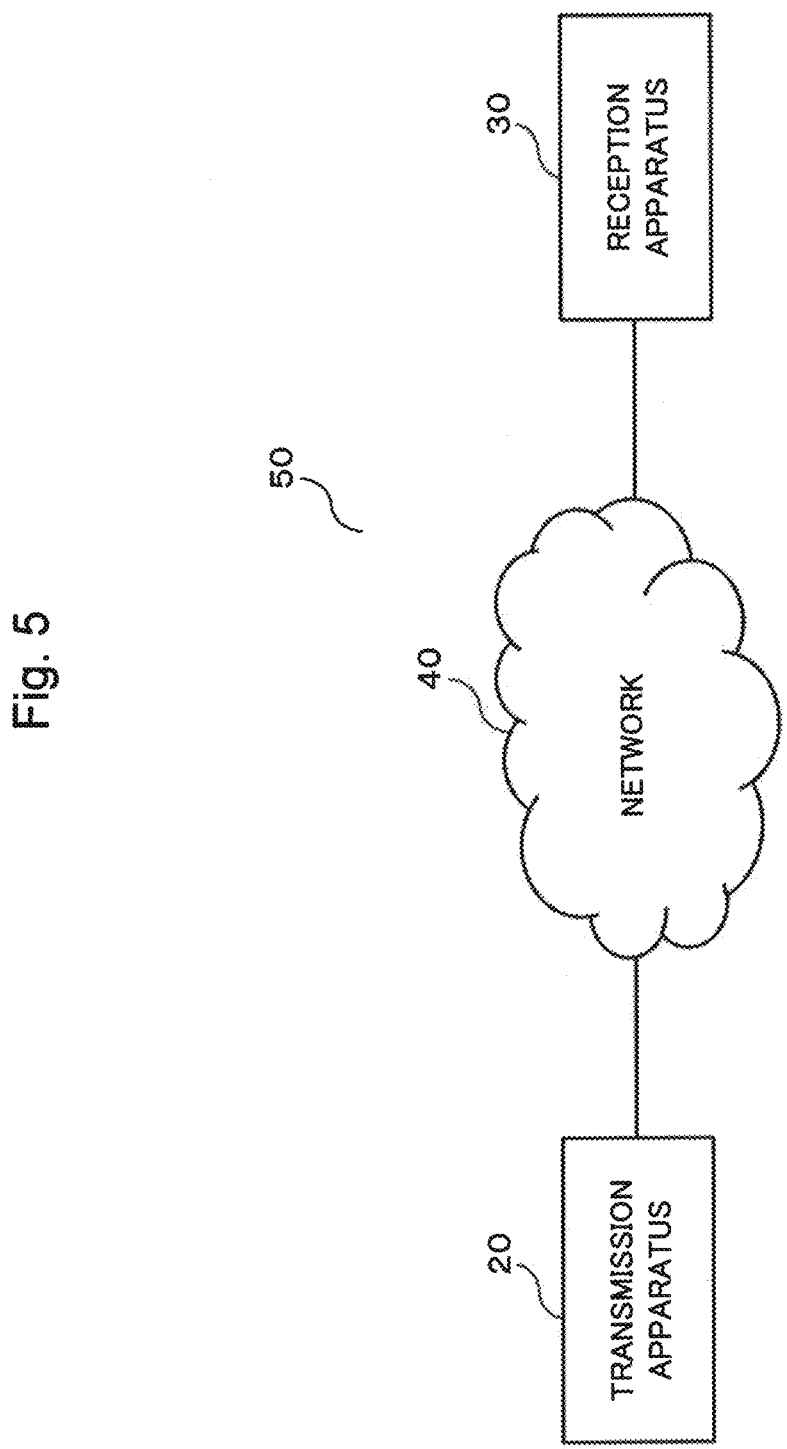
FIG. 5 illustrates a configuration example of an available bandwidth estimation system 50 according to a first example embodiment of the present invention.

FIG. 5 illustrates a configuration example of an available bandwidth estimation system 50 according to the first example embodiment. The available bandwidth estimation system 50 includes a transmission apparatus 20 and a reception apparatus 30. The transmission apparatus 20 and the reception apparatus 30 are connected via a network 40 which is configured by the Internet, for example.

The transmission apparatus 20 transmits a packet train constituted by a predetermined number of packet pairs arranged at equal intervals, and the packet size of the packet pairs increases at a constant rate. A packet pair herein are two packets having the same size arranged at a zero transmitting interval.

The reception apparatus 30 receives the packet train transmitted from the transmission apparatus 20 and calculates an observed delay of the packets included in the received packet train. The reception apparatus 30 also calculates a serialization delay on the basis of the receiving interval between the two packets constituting each packet pair included in the received packet train. Further, the reception apparatus 30 calculates a queueing delay by removing the calculated serialization delay from the calculated observed delay. The reception apparatus 30 then estimates an available bandwidth on the basis of the calculated queueing delay.

Figure 6:
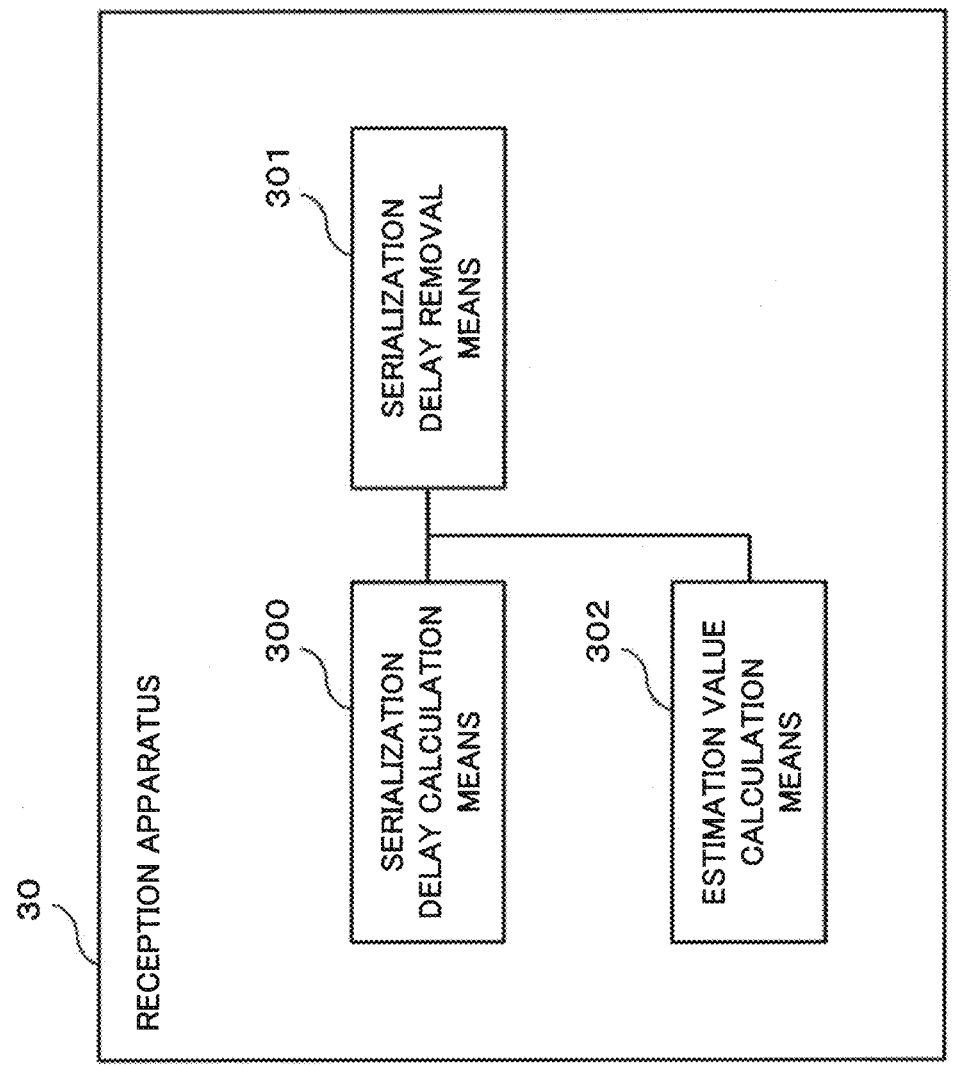
FIG. 6 illustrates a block configuration diagram of a reception apparatus 30 according to the first example embodiment of the present invention.

FIG. 6 is a block diagram illustrating details of the reception apparatus 30 according to the first example embodiment.

The reception apparatus 30 includes a serialization delay calculation means 300, a serialization delay removal means 301, and an estimation value calculation means 302.

The serialization delay calculation means 300 receives a packet train constituted by packet pairs arranged at equal intervals, each of the packet pairs including two packets having the same size arranged at a zero transmitting interval, with the packet size of the packet train increasing at a constant rate. The serialization delay calculation means 300 also calculates observed delays of packets included in the received packet train. In addition, the serialization delay calculation means 300 calculates a serialization delay on the basis of the receiving interval between two packets constituting each packet pair included in the received packet train.

The serialization delay removal means 301 calculates a queueing delay by removing the serialization delay calculated by the serialization delay calculation means 300 from the observed delay calculated by the serialization delay calculation means 300.

The estimation value calculation means 302 estimates an available bandwidth on the basis of the queueing delay calculated by the serialization delay removal means 301.

Figure 7:
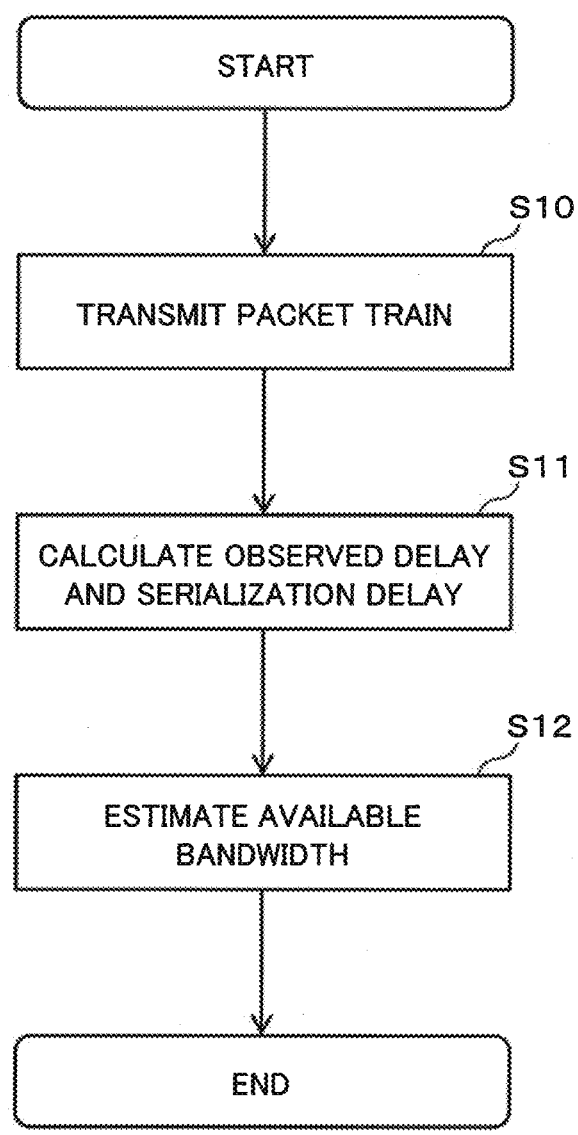
FIG. 7 illustrates an example of an operation flow in the available bandwidth estimation system 50 according to the first example embodiment of the present invention.

An operation example according to the first example embodiment of the present invention will be described with reference to the flowchart of FIG. 7.

Step 10 (hereinafter "step" will be abbreviated as "S")

The transmission apparatus 20 transmits a packet train constituted by a predetermined number of packet pairs arranged at equal intervals, packet size of which increases at a constant rate. A packet pair herein are two packets having the same size arranged at a zero transmitting interval.

S11

The reception apparatus 30 receives the packet train transmitted from the transmission apparatus 20 and calculates an observed delay of each of the packets included in the received packet train. In addition, the reception apparatus 30 calculates a serialization delay on the basis of the receiving interval between the two packets constituting each packet pair.

S12

The reception apparatus 30 calculates a queueing delay by removing the calculated serialization delay from the calculated observed delay. The reception apparatus 30 then estimates an available bandwidth on the basis of the calculated queueing delay.

As described above, according to the first example embodiment of the present invention, it is possible to identify a precise rising position of a queueing delay alone, thereby ensuring estimation precision even when a given observed delay includes a serialization delay.

<Second Example Embodiment>

A second example embodiment of the present invention will be described in detail with reference to drawings.

Figure 8:
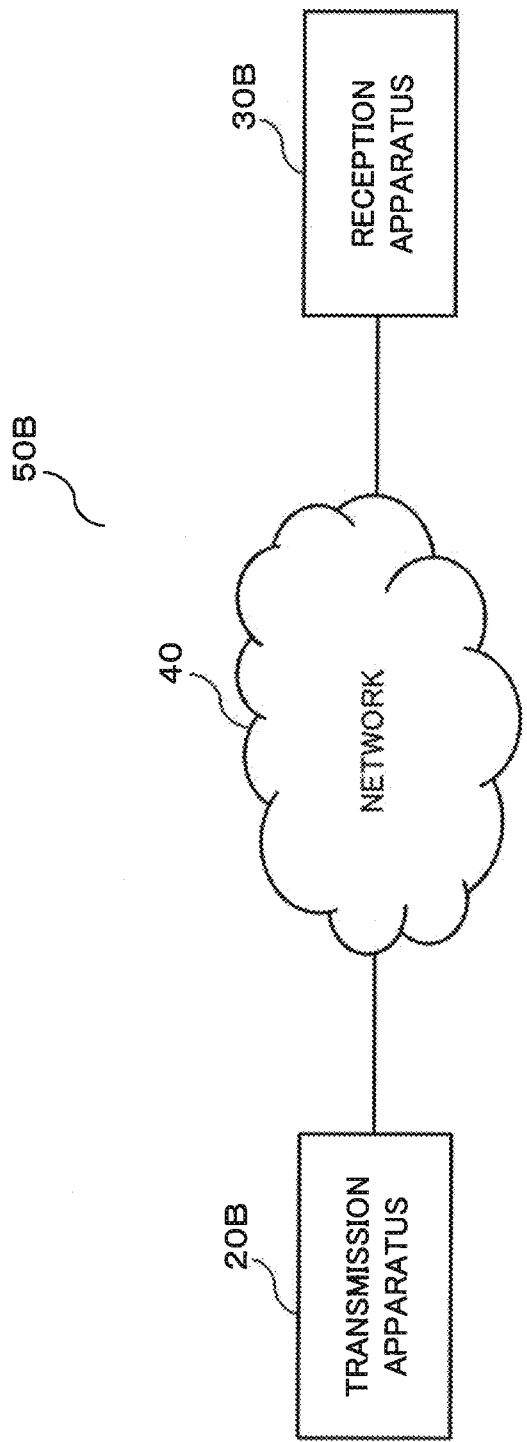
FIG. 8 illustrates a configuration example of an available bandwidth estimation system SOB according to a second example embodiment of the present invention.

FIG. 8 illustrates a configuration example of an available bandwidth estimation system 50B according to the second example embodiment. The available bandwidth estimation system 50B includes a transmission apparatus 20B and a reception apparatus 30B. The transmission apparatus 20B and the reception apparatus 30B are connected via a network 40.

The transmission apparatus 20B transmits given information. Further, the reception apparatus 30B receives the given information transmitted from the transmission apparatus 20B. The transmission apparatus 20B and the reception apparatus 30B may be personal computers (PCs), personal digital assistants (PDAs), mobile phones, smartphones, tablet terminals, fixed-line phones, street multimedia terminals, in-vehicle terminals, network-enabled television sets, network-enabled set-top boxes, gaming machines, network-enabled printers, network-enabled scanners, or other similar devices having the capability of exchanging given information with external devices.

The network 40 is a communication circuit to which the transmission apparatus 20B and the reception apparatus 30B are connected. For example, the network 40 may be configured by the Internet. Further, besides the transmission apparatus 20B and the reception apparatus 30B, other apparatuses which are not depicted may be connected to the network 40, and cross traffic may flow between the other apparatuses which are not depicted.

Figure 9:
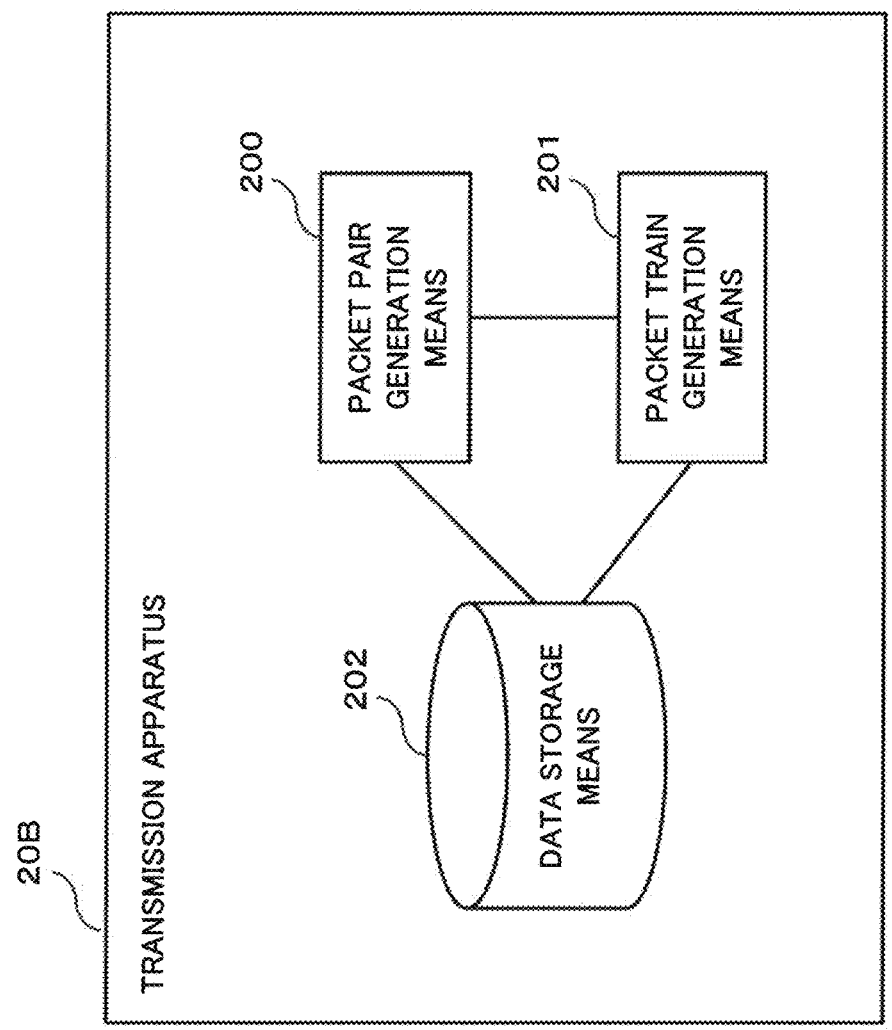
FIG. 9 illustrates a block configuration diagram of a transmission apparatus 20B according to the second example embodiment of the present invention.

FIG. 9 is a block diagram illustrating details of the transmission apparatus 20B according to the second example embodiment.

The transmission apparatus 20B includes a packet pair generation means 200, a packet train generation means 201 and a data storage means 202.

The packet pair generation means 200 generates a plurality of packet pairs on the basis of a starting-packet size 61, number of packet pairs 62, and a packet size increment 63 stored in the data storage means 202, which will be described later. A packet pair herein are two packets that have the same size and are adjoined to each other at a zero transmitting interval. Note that packet pairs generated have different packet sizes. The purpose of providing packet pairs with different packet sizes is to generate a packet train in which each subsequent packet pair is monotonically increased in packet size with respect to the preceding packet pair.

The packet train generation means 201 combines a sequence of a plurality of packet pairs generated by the packet pair generation means 200 together to generate a packet train. In the packet train, each of the packet pairs has an equal transmitting interval. The packet size increment between packet pairs is constant. Note that the packet train generation means 201 generates the packet train on the basis of the packet pair transmitting interval 60, the starting-packet size 61, the number of packet pairs 62, and the packet size increment 63 stored in the data storage means 202, which will be described later. The packet train generation means 201 transmits the generated packet train to the reception apparatus 30B. At the time of the transmission, the packet train generation means 201 embeds a timestamp of the transmission apparatus 20B immediately before the transmission into the packets within the packet train to be transmitted, and then transmits the packet train. Here, the packet train generation means 201 may embed the timestamp of the transmission apparatus 20B immediately before the transmission only into the starting packet within the packet train, and then transmit the packet train. In this case, information indicating the transmitting interval between packet pairs is stored at the reception apparatus 30B in advance, and the reception apparatus 30B calculates the transmitting time of each packet on the basis of the transmitting time of the starting packet and the transmitting interval between the packet pairs.

Figure 10:
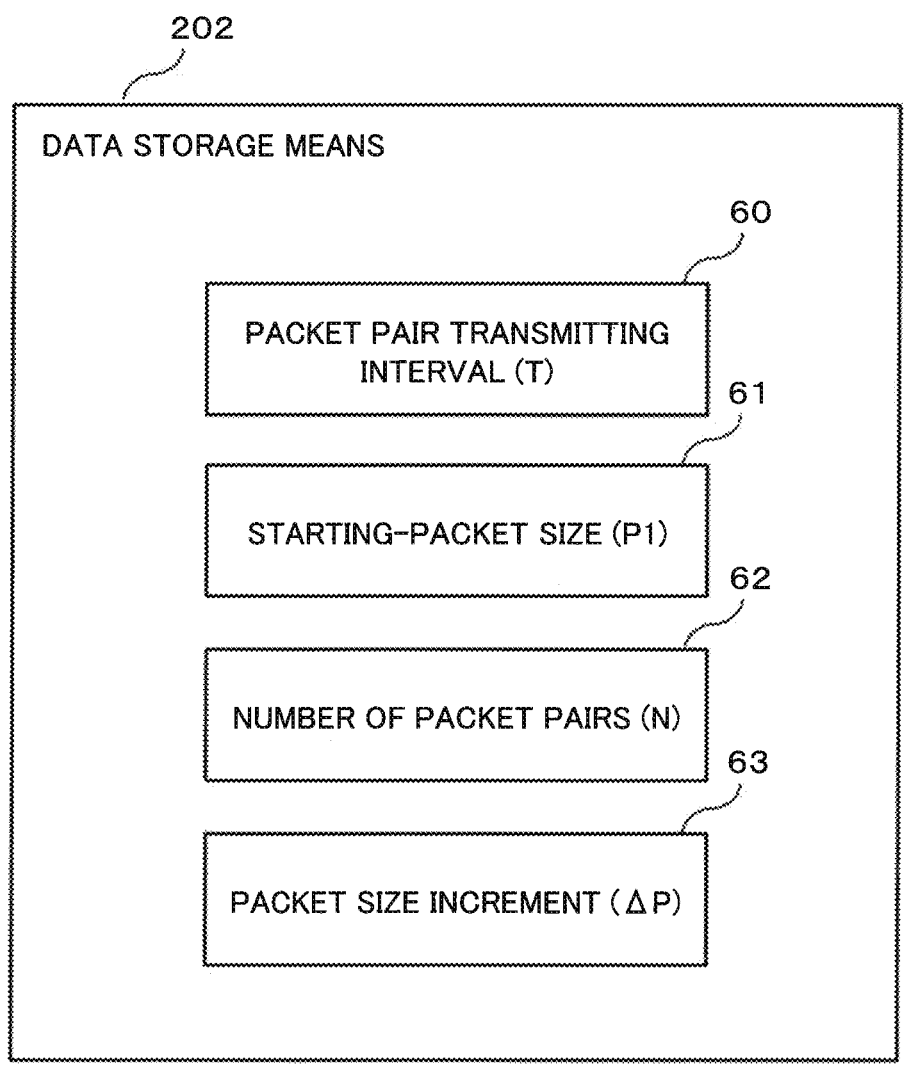
FIG. 10 illustrates information stored in a data storage means 202 according to the second example embodiment of the present invention.

The data storage means 202 stores given information. More specifically, the data storage means 202 stores the packet-pair transmitting interval 60, the starting-packet size 61, the number of packet pairs 62, and the packet size increment 63 as illustrated in FIG. 10.

The packet-pair transmitting interval 60 is the transmitting interval between the packet pairs within the packet train to be transmitted (hereinafter denoted by T).

The starting-packet size 61 is the packet size of the starting pair within the packet train to be transmitted (hereinafter denoted by P1).

The number of packet pairs 62 is the number of packet pairs within the packet train to be transmitted (hereinafter denoted by N).

The packet size increment 63 is an incremental packet size of the packets of a packet pair within the packet train as the number of packet pairs increases by 1 (hereinafter denoted by ΔP). Specifically, the packet size of each of the two successive packets in the i-th packet (i=1, 2, ..., N) is P1+ΔP×(i−1).

Figure 11:
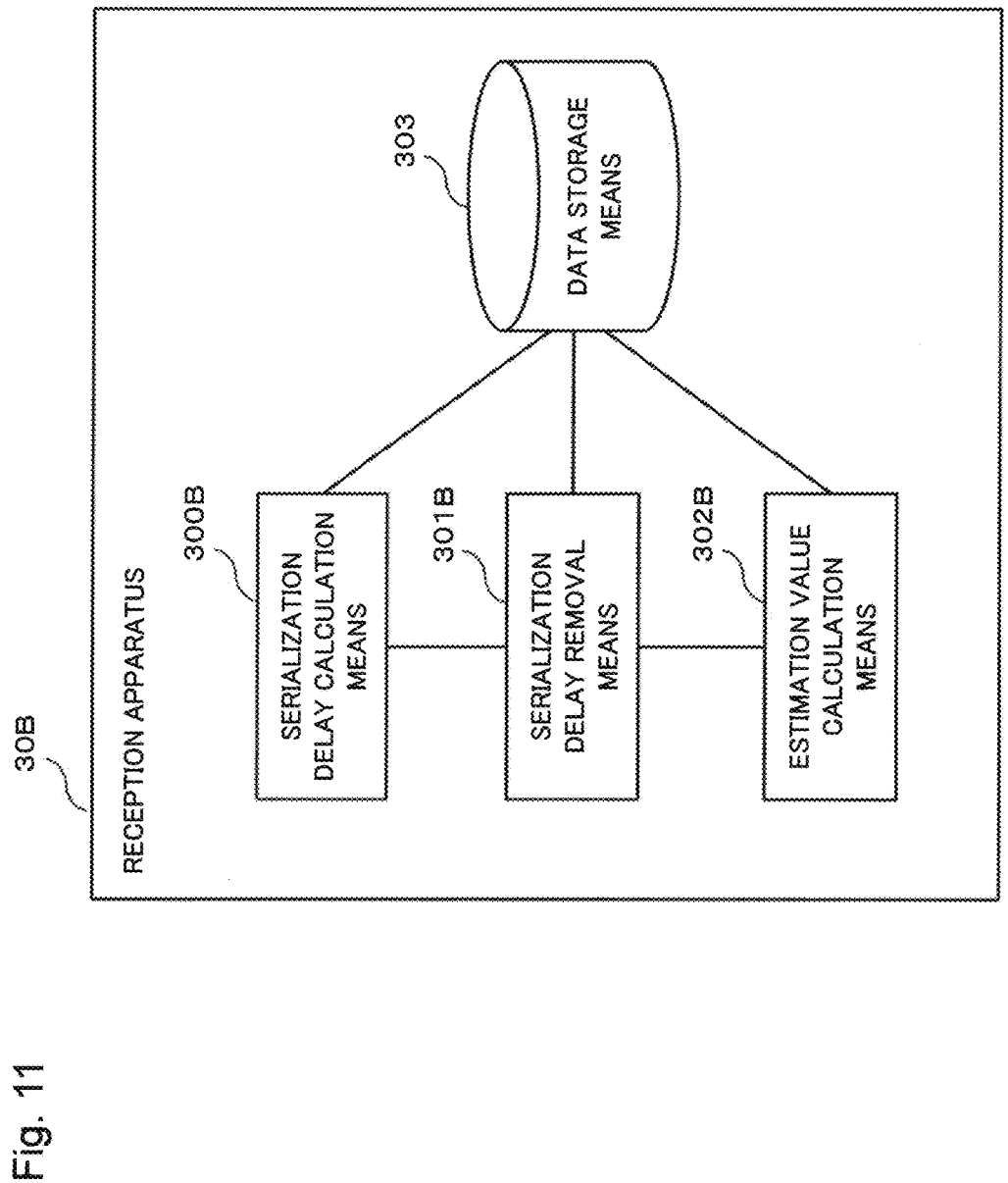
FIG. 11 illustrates a block configuration diagram of a reception apparatus 30B according to the second example embodiment of the present invention.

FIG. 11 is a block diagram illustrating details of the reception apparatus 30B according to the second example embodiment.

The reception apparatus 30B includes a serialization delay calculation means 300B, a serialization delay removal means 301B, an estimation value calculation means 302B, and a data storage means 303.

Figure 12:
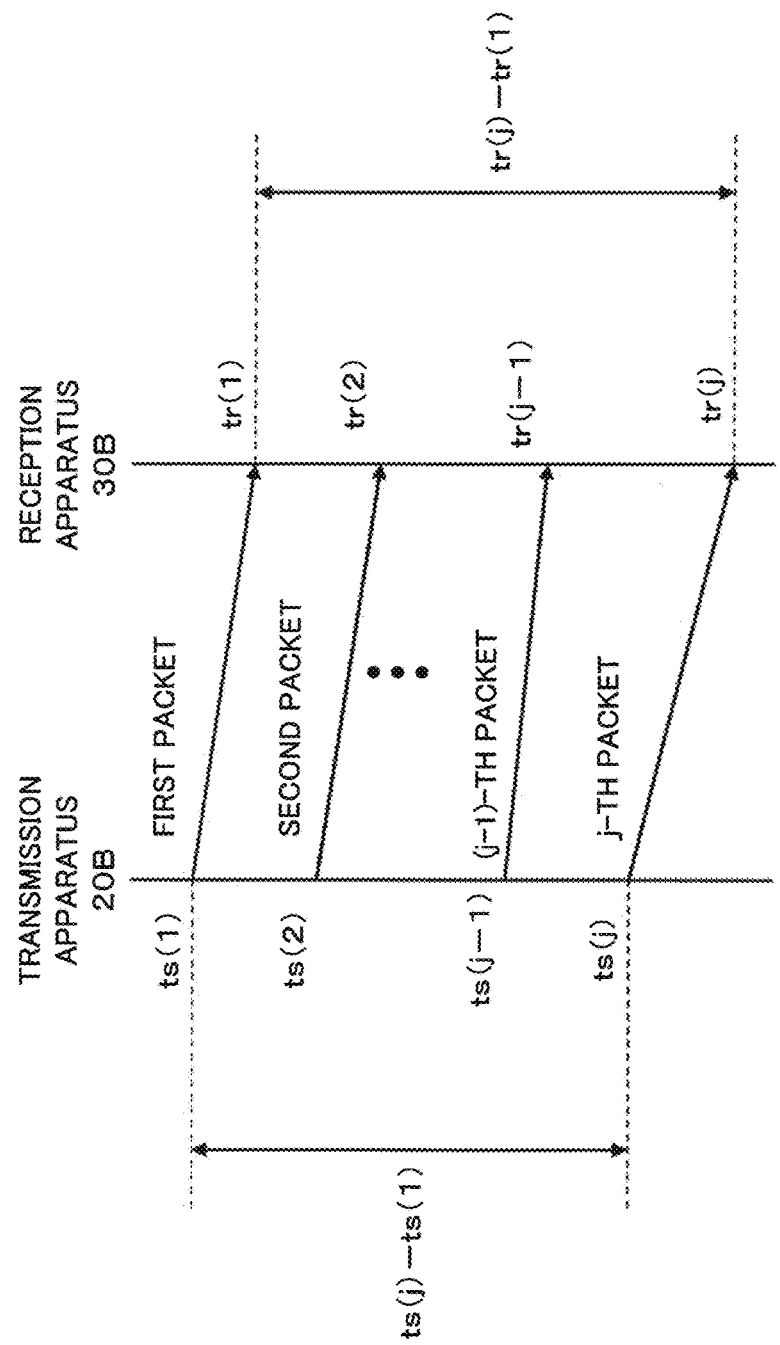
FIG. 12 illustrates the observed delay 80 in the second example embodiment of the present invention.

The serialization delay calculation means 300B receives the packet train transmitted from the transmission apparatus 20B. The serialization delay calculation means 300B then calculates The observed delays 80 on the basis of the received packet train. observed delays 80 are delays obtained by observing packets within a received packet train and include given delays relating to packet communication, such as serialization delays and queueing delays. Here, an observed delay 80 at the j-th packet is given as d(j)={tr(j)−tr(1)}−{ts(j)−ts(1)} (Formula 2). Note that ts(j) represents the transmitting time of the j-th packet (j=2, 3, ..., 2N) at the transmission apparatus 20B. Further, tr(j) represents the reception time of the j-th packet at the reception apparatus 30B. As illustrated in FIG. 12, the observed delay 80 is a value that is obtained by subtracting the elapse time between the transmission of the first packet and the transmission of the j-th packet at the transmission apparatus 20B from the elapse time between the reception of the first packet and the reception of the j-th packet at the reception apparatus 30B. As can be seen, the observed delay 80 is expressed as a function of a packet number as an argument. Further, there are (2N−1) observed delays 80 for one packet train constituted by N packet pairs. Thus, the serialization delay calculation means 300B calculates the observed delay 80 on the basis of the transmitting time of a packet to be transmitted from the transmission apparatus 20B, the reception time when the packet transmitted from the transmission apparatus 20B is received, and Formula 2 given above.

Moreover, the serialization delay calculation means 300B calculates a predetermined parameter for calculating serialization delays, on the basis of each received packet train. The serialization delay calculation means 300B then calculates serialization delays on the calculated parameter.

Figure 13:
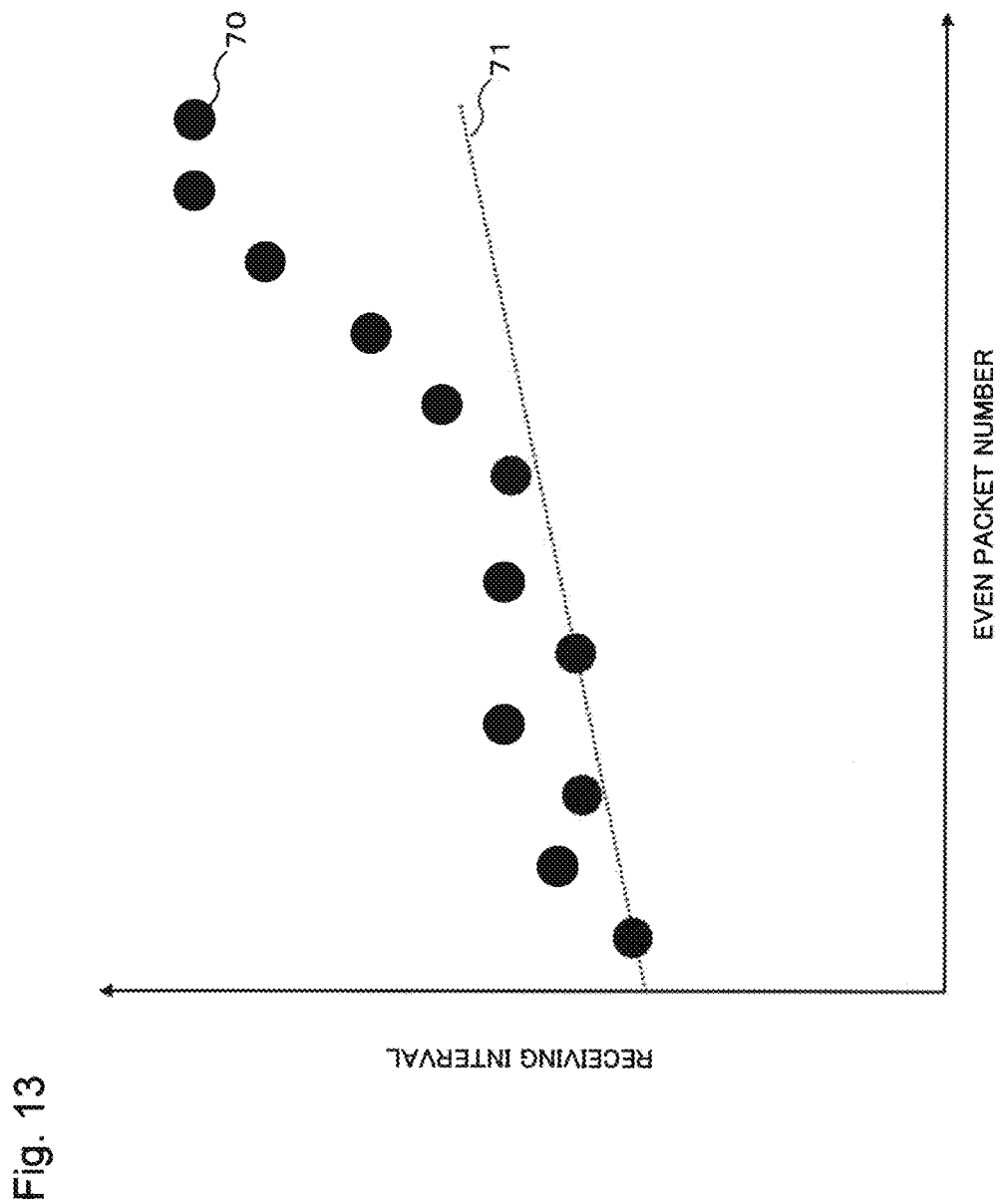
FIG. 13 illustrates the receiving interval between even-numbered packets and odd-numbered packets in the same packet pair in the second example embodiment of the present invention.

More specifically, the serialization delay calculation means 300B calculates the receiving interval between the reception of an odd-numbered packet to be transmitted first in a packet pair included in a packet train and the reception of the even-numbered packet to be transmitted later in the packet pair. The odd-numbered packet to be transmitted first and the even-numbered packet to be transmitted later in each packet pair are transmitted at a zero transmitting interval. Accordingly, the calculated receiving interval will be equal to the value of a serialization delay alone that occurs between the odd-numbered packet to be transmitted first and the even-numbered packet to be transmitted later in each packet pair, or equal to the sum of a serialization delay and a queueing delay. Subsequently, the serialization delay calculation means 300B generates a graph with a horizontal axis representing even packet numbers (2, 4, ..., 2N) and a vertical axis representing the calculated receiving intervals as illustrated in FIG. 13. The serialization delay calculation means 300B then calculates a straight line 71 that satisfies the conditions that: the straight line has the most moderate positive slope that passes through two points among a set of points of receiving intervals 70 plotted on the graph; and all of the points are in a region above the straight line. The above two points herein are the points representing the receiving intervals only when the serialization delay occurs. Accordingly, the calculated straight line 71 is the straight line representing the relationship between a packet size and the value of the serialization delay that occurs depending on the corresponding packet size. The serialization delay calculation means 300B calculates the slope and an intercept of the calculated straight line 71 and stores the slope and the intercept in the data storage means 303. The serialization delay calculation means 300B then uses the calculated slope and intercept of the straight line 71 to calculate the serialization delays occurred at odd-numbered packets and stores the serialization delays in the data storage means 303. For example, a case can be considered where a straight line 71 calculated by the serialization delay calculation means 300B is represented as y=ax+b (Formula 3). Note that "a" in Formula 3 represents the slope of the straight line 71, "b" represents the intercept of the straight line 71, "x" represents the packet number, and "y" represents the receiving interval (serialization delay). In this case, the serialization delay calculation means 300B assigns 3 to "x" in Formula 3, for example, to calculate the serialization delay occurred at the third packet having the packet size of P1+2×ΔP. The serialization delay calculation means 300B performs a similar calculation for all of the odd-numbered packets, thereby calculating serialization delays occurred at the odd-numbered packets.

Figure 14:
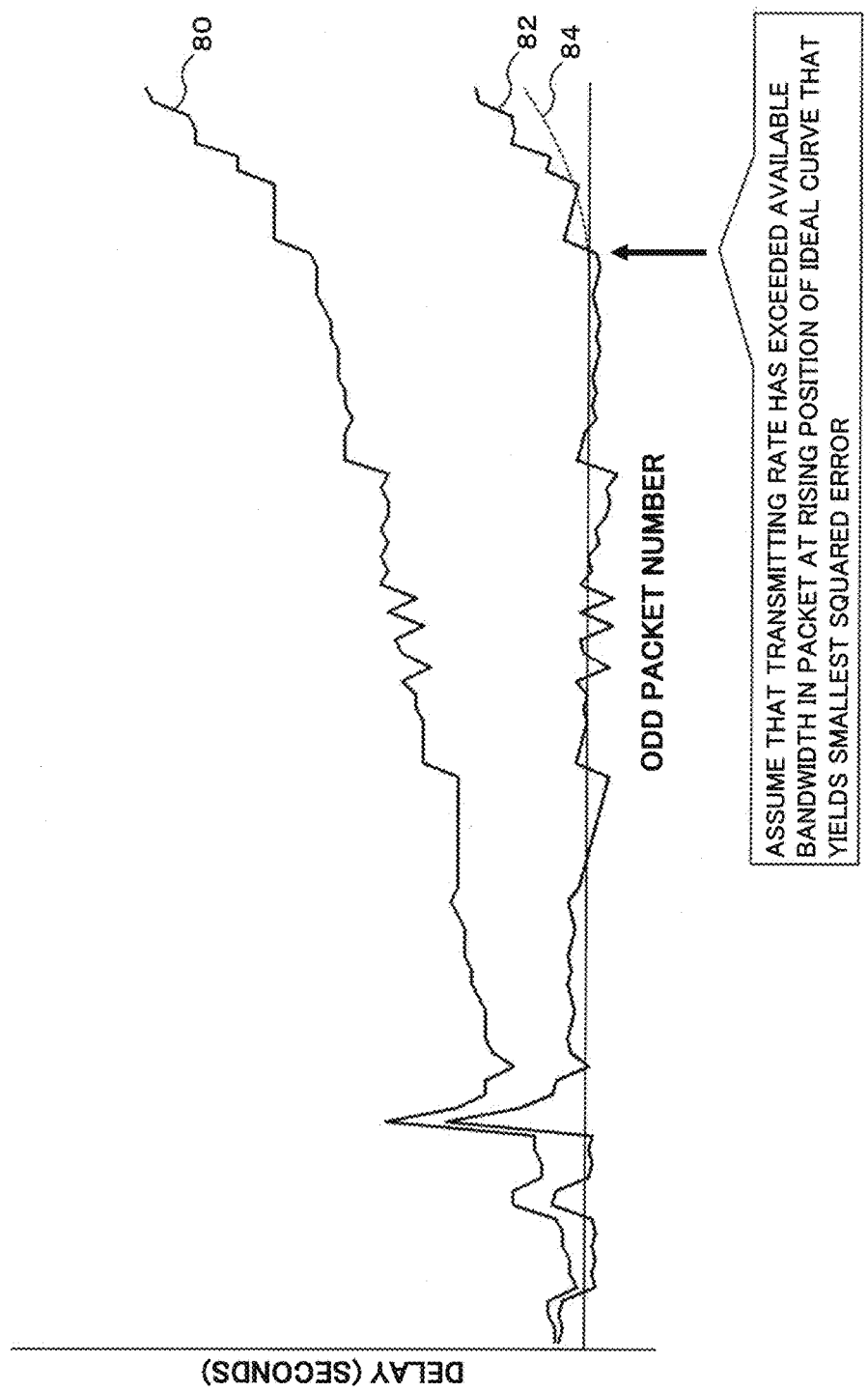
FIG. 14 illustrates an observed delay and queueing delay of packets with odd packet numbers in the second example embodiment of the present invention.

The serialization delay removal means 301B calculates a pure queueing delay 82 by removing the influence of a serialization delay from an observed delay 80 calculated by the serialization delay calculation means 300B. More specifically, the serialization delay removal means 301B generates a graph with a horizontal axis representing odd packet numbers (3, 5, ..., 2N−1) and a vertical axis representing observed delays 80 as illustrated in FIG. 14. In this case, the observed delays 80 are a mixture of given delays relating to packet communication, such as queueing delays and serialization delays. The serialization delay removal means 301B subtracts the value of serialization delay calculated by the serialization delay calculation means 300B from the value of the observed delay 80 corresponding to the odd-numbered packet. In this way, the serialization delay removal means 301B can calculate the pure queueing delay (hereinafter denoted by q(i)) 82 not influenced by the serialization delay. The serialization delay removal means 301B then stores the calculated q(i) in the data storage means 303. For example, the serialization delay removal means 301B subtracts the value of the serialization delay y relating to the third packet from the value of the observed delay d(3) relating to the third packet to calculate the pure queueing delay q(3) not influenced by the serialization delay. The serialization delay removal means 300B performs a similar calculation for values of serialization delays 80 for all of the odd-numbered packets to calculate queueing delays 82 of the odd-numbered packets.

The estimation value calculation means 302B analyzes queueing delays 82 calculated by the serialization delay removal means 301B to calculate an estimated available bandwidth 83 and store the estimated available bandwidth 83 in the data storage means 303. More specifically, the estimation value calculation means 302B generates a graph with a horizontal axis representing odd packet numbers (3, 5, ..., 2N−1) and a vertical axis representing the calculated queueing delays 82 as illustrated in FIG. 14. Further, the estimation value calculation means 302B plots, as ideal progressions of queueing delay to be assumed in the total absence of noise or the like, (N−1) ideal curves each of which is a horizontal straight line and a parabola connected together on the generated graph. The reason for plotting (N−1) ideal curves each of which is the horizontal straight line and the parabola connected together on the generated graph is as follows. First, it is assumed that when the transmitting rate for each packet is lower than the true value of an available bandwidth, no queueing delay occurs and therefore its progression forms a horizontal straight line (a first straight line with a slope of 0). Further, it is assumed that when the transmitting rate for each packet exceeds the true value of the available bandwidth, the queueing delay defined as $\{tr(j)-tr(1)\}-\{ts(j)-ts(1)\}$ rises in parabolic shape and its progression forms a parabola. Note that the parabola portion of each ideal curve can be represented as an integral of a sloped straight line $(\Delta P \times Ts/Pk) \times m + (P1-\Delta P) \times Ts/Pk$ described in PTL 1. Here, Pk represents the packet size of the k-th packet; Ts represents $Ts=ts(k)-ts(k-1)$; k represents an odd packet number at which the packet transmitting rate exceeds the true value of an available bandwidth for the first time; m represents $m=k, k+2, \ldots, 2N-1$.

The estimation value calculation means 302B then calculates, for each of the plotted ideal curves, the sum of squared errors between the calculated queueing delay 82 and the each of the plotted ideal curves, and identifies the ideal curve 84 that yields the smallest sum as illustrated in FIG. 14. The estimation value calculation means 302B calculates the packet number at the connection point of the horizontal straight line and the parabola of the identified ideal curve 84. The estimation value calculation means 302B then divides the packet size at the calculated packet number by a transmitting interval T to calculate an estimated value of an available bandwidth.

Figure 15:
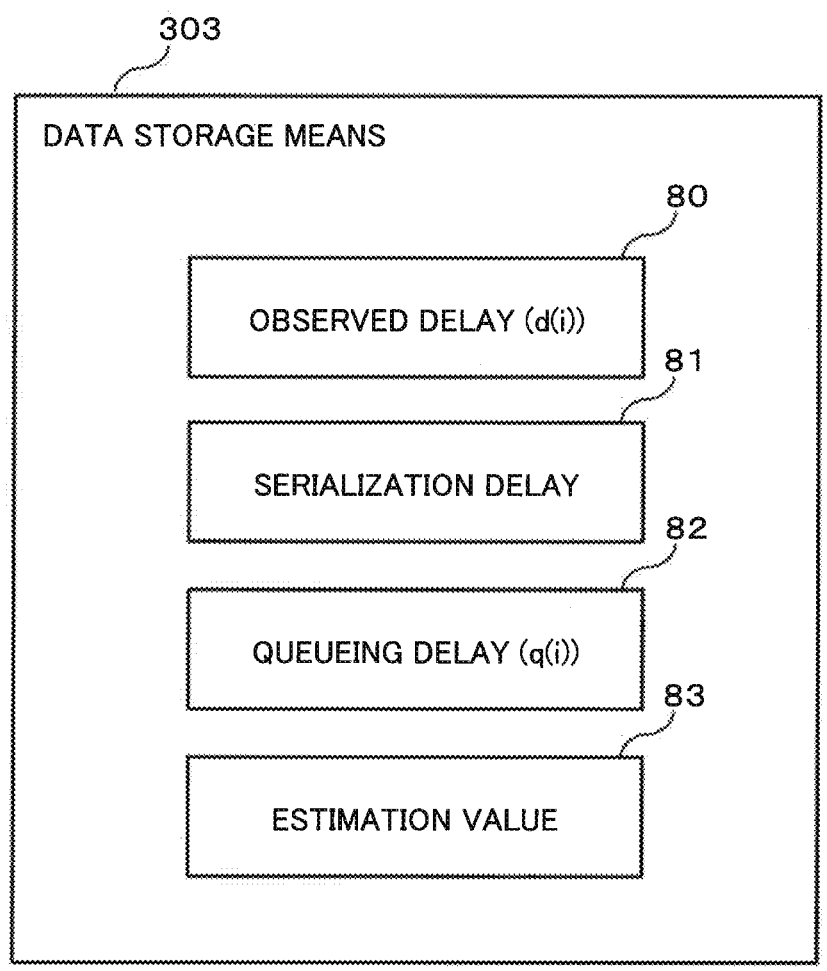
FIG. 15 illustrates information stored in a data storage means 303 according to the second example embodiment of the present invention.

The data storage means 303 stores given information. More specifically, the data storage means 303 stores an observed delay 80, a serialization delay 81, a queueing delay 82, and an estimation value 83 as illustrated in FIG. 15.

The observed delay 80 is a delay that occurs at a packet within a received packet train and is calculated by the serialization delay calculation means 300B described above. The observed delay 80 includes given delays relating to packet communication, such as a serialization delay and a queueing delay.

The serialization delay 81 is the value of a serialization delay occurred at an odd-numbered packet and calculated by the serialization delay calculation means 300B on the basis of the slope and intersect of a straight line 71.

The queueing delay 82 is a pure queueing delay obtained by removing the influence of the serialization delay from the observed delay 80. As described above, the queueing delay 82 is calculated by the serialization delay removal means 301B.

The estimation value 83 is an estimated value of an available bandwidth calculated by the estimation value calculation means 302B.

Figure 16:
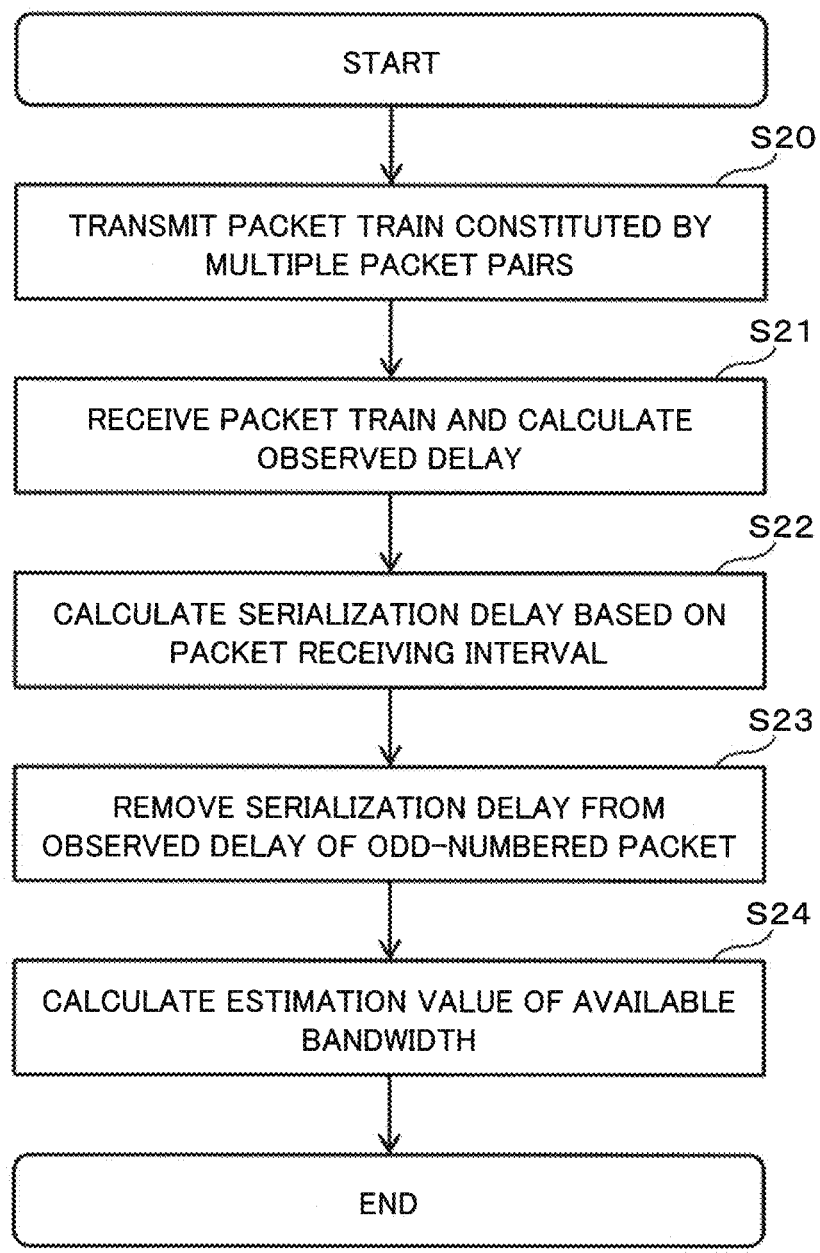
FIG. 16 illustrates an example of an operation flow in the available bandwidth estimation system 50B according to the second example embodiment of the present invention.

An operation example of the available bandwidth estimation system 50B according to the second example embodiment of the present invention will be described with reference to a flowchart of FIG. 16.

S20

The packet pair generation means 200 of the transmission apparatus 20B generates N packet pairs each of which is constituted by two packets that have the same packet size and are adjoined to each other at a zero transmitting interval. Note that the packet pairs have different packet sizes.

The packet train generation means 201 of the transmission apparatus 20B combines the above-described generated N packet pairs together to generate a packet train. In the packet train, each of the packet pairs has an equal transmitting interval. In addition, the packet size increment between packet pairs is constant. The transmission apparatus 20B transmits the generated packet train to the reception apparatus 30B. Note that before transmitting the packet train, the packet train generation means 201 embeds a timestamp ts(j) of the transmission apparatus 20B immediately before the transmission into the packets within the packet train to be transmitted (where j represents a packet number and j=1, 2, . . . , 2N).

Figure 17:
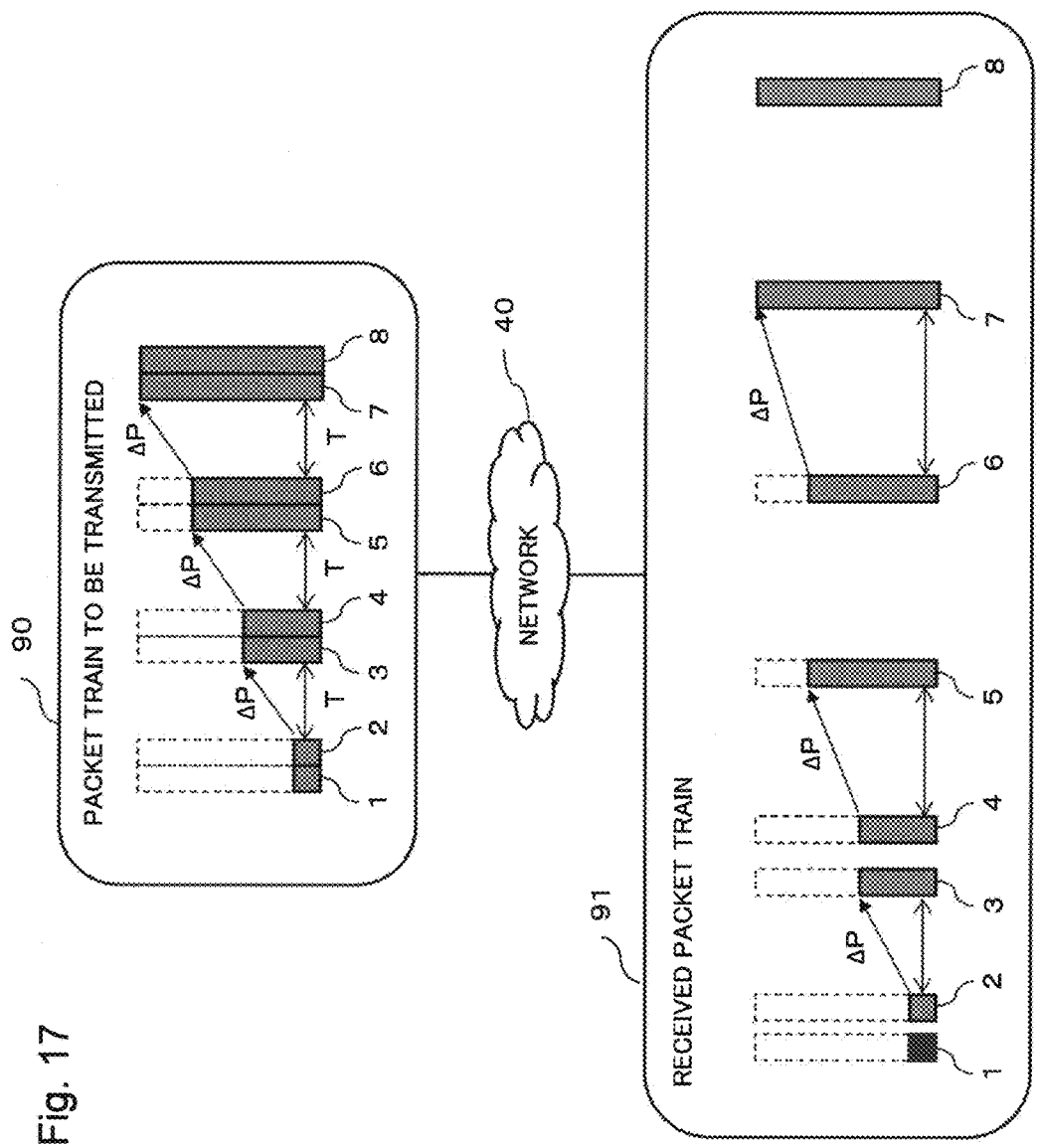
FIG. 17 illustrates an example of a packet train transmitted and received in the available bandwidth estimation system 50B according to the second example embodiment of the present invention.

FIG. 17 illustrates an example of a packet train 90 transmitted by the packet train generation means 201. The packet train 90 illustrated in FIG. 17 is constituted by four packet pairs. The two packets in the same packet pair have the same size. For example, both of packet 1 and packet 2 in the first packet pair have a packet size of P1. Further, the packets in each packet pair are transmitted at a zero transmitting interval. For example, the transmission apparatus 20B transmits packet 1 in the first packet pair and then transmits packet 2 at a zero transmitting interval. Further, packet pairs are transmitted at constant intervals T. For example, the transmission apparatus 20B transmits packet 2 and, after the elapse of T, transmits packet 3. Further, the increment of the packet size between the packet pairs is constant. For example, the increment of the packet size between the first packet pair and the second packet pair is $\Delta P$.

S21

The serialization delay calculation means 300B of the reception apparatus 30B receives the packet train transmitted from the transmission apparatus 20B and calculates observed delays 80 of the packets within the received packet train. FIG. 17 illustrates an example of a packet train 91 received by the serialization delay calculation means 300B. The received packet train 91 illustrates a case where a queueing delay occurs between packet 4 and packet 5. Here, serialization delays having different values occur between packet 1 and packet 2, and between packet 3 and packet 4. Further, a serialization delay occurs between packet 2 and packet 3.

Accordingly, the receiving interval between packet 2 and packet 3 is equal to the sum of the transmitting interval T and the serialization delay. Further, both of queueing delay and serialization delay occur between packet 4 and packet 5. Accordingly, the receiving interval between packet 4 and packet 5 is equal to the sum of the transmitting interval T of the packet pair, the queueing delay, and the serialization delay. Further, both of queueing delay and serialization delay occur between each of the packets subsequent to packet 5.

S22

The serialization delay calculation means 300B of the reception apparatus 30B generates a graph with a horizontal axis representing even packet numbers (2, 4, . . . , 2N) and a vertical axis representing the receiving interval between an odd-numbered packet to be transmitted first and an even-numbered packet to be transmitted later in each packet pair. For example, in the case of the received packet train 91 illustrated in FIG. 17, the serialization delay calculation means 300B calculates the receiving interval between packet 1 and packet 2 on the basis of the reception time of packet 1 and the reception time of packet 2. In this case, the calculated receiving interval is equal to the serialization delay that occurs between packet 1 and packet 2. Further, the receiving interval calculated on the basis of the reception time of packet 5 and the reception time of packet 6 is equal to the sum of the serialization delay and the queueing delay occurred between packet 5 and packet 6. In other words, the graph generated by the serialization delay calculation means 300B is a graph that plots the values of the serialization delays or the sums of the values of the serialization delay and the queueing delay occurred between the pairs within each packet pair.

Subsequently, the serialization delay calculation means 300B calculates a straight line 71 that satisfies the conditions that: the straight line has the most moderate positive slope that passes through two points among a set of points of receiving intervals plotted on the generated graph; and all of the points are in a region above the straight line. Then the serialization delay calculation means 300B calculates the slope and intercept of the straight line 71. Moreover, the serialization delay calculation means 300B stores the calculated slope and intersect of the straight line 71 in the data storage means 303. Note that the calculated slope and intercept of the straight line 71 are used when calculating serialization delays occurred at received packets. Here, in the case of the packet train 91 illustrated in FIG. 17, for example, only the serialization delay occurs between packet 1 and packet 2, and between packet 3 and packet 4. On the other hand, the serialization delay and the queueing delay occur between packet 5 and packet 6, and between packet 7 and packet 8. Specifically, the straight line connecting the receiving interval between packet 1 and packet 2, and the receiving interval between packet 3 and packet 4 in which no queueing delay is included will be a straight line that satisfies the conditions described above.

Further, the serialization delay calculation means 300B uses the calculated slope and intercept of the straight line 71 to calculate serialization delays occurred at the odd-numbered packets.

S23

The serialization delay removal means 301B of the reception apparatus 30B subtracts the value of the serialization delay calculated by the serialization delay calculation means 300B from the value of the observed delay 80 of each of the odd-numbered packets. The serialization delay removal means 301B thus calculates the pure queueing delay 82 not influenced by the serialization delay. The serialization delay removal means 301B then stores the calculated pure queueing delay 82 in the data storage means 303. For example, the serialization delay removal means 301B subtracts the value of the serialization delay occurred at the third packet calculated by the serialization delay calculation means 300B from the value of an observed delay d(3) to calculate a queueing delay q(3) not influenced by the serialization delay.

S24

The estimation value calculation means 302B of the reception apparatus 30B plots queueing delays 82, obtains an ideal curve that best fits the queueing delays 82, and identifies a rising position of the queueing delays. In addition, the estimation value calculation means 302B divides the packet size that corresponds to the identified position by the transmitting interval T of packet pairs to calculate an estimation value of an available bandwidth. Further, the estimation value calculation means 302B stores the calculated estimation value of the available bandwidth in the data storage means 303.

As described above, the transmission apparatus 20B in the second example embodiment of the present invention combines a plurality of packets into one to generate a packet train and transmits the packet train to the reception apparatus 30B. Note that each of the packet pairs in the packet train has an equal transmitting interval. The packet size increment between packet pairs is constant. The reception apparatus 30B calculates observed delays obtained by observing the packets within the packet train received from the transmission apparatus 20B on the basis of the packet train. In addition, the reception apparatus 30B calculates a serialization delay on the basis of the receiving interval between two packets constituting each packet pair. The reception apparatus 30B then subtracts the serialization delay from the observed delay to calculate a pure queueing delay not influenced by the serialization delay and estimates an available bandwidth on the basis of the calculated queueing delay. According to the second example embodiment of the present invention, it is possible to identify a precise rising position of the queueing delay alone, thereby ensuring estimation precision even when a given observed delay includes a serialization delay. The second example embodiment of the present invention enables to keep the transmitting rate of videos below or equal to an estimated value of the available bandwidth in a video chatting, a videophone conversation, a videoconference, or the like in which videos are bi-directionally exchanged for communication between given terminals, for example. In other words, according to the second example embodiment of the present invention, it is possible to reduce packet losses that occur when the sum of the transmitting rate of video and cross traffic exceeds the physical bandwidth of a bottleneck link on the communication line, thereby ensuring video quality.

Note that the serialization delay calculation means 300B calculates a straight line 71 that satisfies predetermined conditions at S22 in the second example embodiment. The predetermined conditions are that: the straight line has the most moderate positive slope that passes through two points among a set of points of receiving intervals plotted on a generated graph; and all of the points are in a region above the straight line. However, the method for calculating the straight line 71 is not limited to the method described above. For example, the serialization delay calculation means 300B may calculate the straight line 71 and the slope and intersect of the straight line 71 by performing linear regression on all of the plotted points.

Further, the reception apparatus 30B according to the second example embodiment of the present invention may include a control means which is not depicted, and the control means may control the means of the reception apparatus 30B. The control means may be configured with a CPU (Central Processing Unit), a ROM (Read Only Memory), a RAM (Random Access Memory) and the like, for example. In addition, the CPU acting as the control means may control the means based on a program read from a ROM. Moreover, the CPU acting as the control means may read a computer-readable program from a storage medium on which the program is stored by using a reading device or the like (not depicted) and may perform control on the means.

While the invention has been particularly shown and described with reference to exemplary embodiments thereof, the invention is not limited to these embodiments. The present invention can be implemented on the basis of variations, replacements, and adjustments of the example embodiments. In other words, the present invention includes variations and modifications that can be implemented according to all of the disclosure and the technical ideas disclosed herein. Note that reference numerals attached to the drawings are given to elements for convenience of illustration to help understanding of the present invention and are not intended to limit the present invention to the modes illustrated in the drawings.

REFERENCE SIGNS LIST 10, 90 Packet train to be transmitted
11, 91 Received packet train
12, 82 Queueing delay
13, 84 Ideal curve
20, 20B Transmission apparatus
200 Packet pair generation means
201 Packet train generation means
202, 303 Data storage means
30, 30B Receiving apparatus
300, 300B Serialization delay calculation means
301, 301B Serialization delay removal means
302, 302B Estimation value calculation means
40 Network
50, 50B Available bandwidth estimation system
60 Packet pair transmitting interval
61 Starting-packet size
62 Number of packet pairs
63 Packet size increment
70 Receiving interval
71 Straight line
80 Observed delay
81 Serialization delay
82 Queueing delay
83 Estimation value

What is claimed is:

1. An available bandwidth estimation system comprising:
a transmission apparatus;
and a reception apparatus, wherein the available bandwidth estimation system estimates an available bandwidth on a network connecting the transmission apparatus and the reception apparatus, wherein
the transmission apparatus transmits a packet train constituted by packet pairs arranged at equal intervals, each of the packet pairs including two packets of an identical size arranged at a zero transmitting interval, with the packet size of the packet train increasing at a constant rate, and
the reception apparatus receives the packet train transmitted from the transmission apparatus, calculates an observed delay of each packet included in the received packet train, calculates a serialization delay based on a receiving interval between two packets constituting each packet pair included in the received packet train, calculates a queueing delay by removing the calculated serialization delay from the calculated observed delay, and estimates an available bandwidth based on the calculated queueing delay.

2. The available bandwidth estimation system according to claim 1, wherein
the reception apparatus calculates a straight line that satisfies conditions that the straight line has a most moderate positive slope that passes through any two points among a set of points which are arranged in the order of packet pairs and each of which represents a receiving interval between two packets constituting the packet pair, and that all of the points are in a region above the straight line, and calculates the serialization delay based on the slope and an intersect of the calculated straight line.

3. The available bandwidth estimation system according to claim 2, wherein
the reception apparatus calculates the queueing delay by subtracting the serialization delay calculated based on the slope and the intersect of the straight line from the calculated observed delay.

4. The available bandwidth estimation system according to claim 1, wherein
the reception apparatus calculates the receiving interval between the packets within a same packet pair included in the received packet train, based on a difference between the reception time of an odd-numbered packet to be transmitted first and the reception time of an even-numbered packet to be transmitted later.

5. The available bandwidth estimation system according to claim 1, wherein
the reception apparatus calculates an ideal curve representing the queueing delay in an ideal situation in which noise influencing the queueing delay does not exist,
calculates a squared error between the calculated queueing delay and a formula representing the ideal curve, and
estimates the available bandwidth based on the ideal curve that yields the smallest calculated squared error.

6. The available bandwidth estimation system according to claim 5, wherein the reception apparatus calculates the ideal curve, the ideal curve being a first straight line and a parabola connected together, wherein
the first straight line has a slope of 0 in a range in which a transmitting rate of the packet does not exceed a true value of the available bandwidth, and
the parabola is obtained by integrating a second straight line having a slope of a value obtained by dividing the product of an incremental packet size and a transmitting interval by the packet size of the packet at which the transmitting rate exceeds the true value of the available bandwidth for the first time, in a range in which the transmitting rate of the packet exceeds the true value of the available bandwidth.

7. An available bandwidth estimation method for estimating an available bandwidth on a network connecting a transmission apparatus and a reception apparatus, the method comprising:
transmitting a packet train constituted by packet pairs arranged at equal intervals, each of the packet pairs including two packets of an identical size arranged at a zero transmitting interval, with the packet size of the packet train increasing at a constant rate; and
receiving the packet train, calculating an observed delay of each packet included in the received packet train, calculating a serialization delay based on a receiving interval between two packets constituting each packet pair included in the received packet train, calculating a queueing delay by removing the calculated serialization delay from the calculated observed delay, and estimating the available bandwidth based on the calculated queueing delay.

8. A reception apparatus comprising:
a serialization delay calculation unit for receiving a packet train constituted by packet pairs arranged at equal intervals, each of the packet pairs including two packets of an identical size arranged at a zero transmitting interval, with the packet size of the packet train increasing at a constant rate, calculating an observed delay of each packet included in the received packet train, and calculating a serialization delay based on a receiving interval between two packets constituting each packet pair included in the received packet train;

a serialization delay removal unit for calculating a queueing delay by removing the calculated serialization delay from the calculated observed delay; and an estimation value calculation unit for estimating an available bandwidth based on the calculated queueing delay.

\* \* \* \* \*